United States Patent [19]

Yonezawa et al.

[11] Patent Number: 5,419,694
[45] Date of Patent: May 30, 1995

[54] METAL MOULD DROPPING PREVENTION DEVICE

[75] Inventors: Keitaro Yonezawa; Shoji Yokoyama, both of Kobe, Japan

[73] Assignee: Kabushiki Kaisha Kosmek, Kobe, Japan

[21] Appl. No.: 41,467

[22] Filed: Apr. 2, 1993

[30] Foreign Application Priority Data

Apr. 10, 1992 [JP] Japan .............. 4-030837 U

[51] Int. Cl.⁶ .............................. B29C 33/30
[52] U.S. Cl. ........................ 425/186; 425/183; 425/190; 425/195
[58] Field of Search ............ 425/183, 185, 186, 190, 425/192 R, 193, 195; 100/918; 29/33 K; 164/323

[56] References Cited

U.S. PATENT DOCUMENTS

| | | | |
|---|---|---|---|
| 4,462,783 | 7/1984 | Hehl | 425/183 |
| 5,063,648 | 11/1991 | Yonezawa et al. | 29/33 K |
| 5,217,727 | 6/1993 | Kameyama et al. | 425/185 |

FOREIGN PATENT DOCUMENTS

WO87/02306  4/1987  Japan ................... 425/183

Primary Examiner—James P. Mackey
Attorney, Agent, or Firm—Bacon & Thomas

[57] ABSTRACT

A stopping device (37) is provided in a metal mould depository stand (6) and a stop cancelling device (39) is provided in a metal mould replacing carriage (3). When a metal mould (13) supported by the stand (6) is transferred onto the carriage (3), firstly the carriage (3) is moved to a location of the stand (6) a stopped condition of which is going to be cancelled, so as to make an output portion (53) of the cancelling device (39) face an actuating member (44) of the stopping device (37). Then, the output portion (53) is made to advance from a return position (G) to an advanced position (H). Thereupon, the actuating member (44) is changed over to a retracting actuation position (D), so that the actuating member (44) changes over a stopper member (42) to a retracted posture (B).

10 Claims, 13 Drawing Sheets

METAL MOULD DROPPING PREVENTION DEVICE

BACKGROUND OF THE INVENTION

1. Field of the Invention

The present invention relates to a metal mould dropping prevention device for use in a metal mould replacing system and, more specifically, to a device adapted to prevent a dropping of a metal mould placed on a metal mould replacing carriage or a metal mould depository stand from the carriage or the depository stand.

2. Description of Prior Art

Such a dropping prevention device known by the inventors of the present invention is the following one.

As shown in FIGS. 20 and 21, a stop lever 237 is supported swingably by a block 241 fixedly secured onto an upper surface of a metal mould depository stand 206. A stopper portion 242 is fixed to the upper end of the stop lever 237 while an actuating roller 244 is supported by a lower end thereof. A stop cancelling block 239 is fixedly secured to a side of a carriage 203 so as to face the roller 244.

Under such a condition that the stop lever 237 has been changed over to a downward posture ( refer to a solid line figure in FIG. 21 ), the stopper portion 242 is changed over to a projecting posture A. Thereby, a leftward movement of the metal mould 213 in FIG. 20 is blocked through its controlled portion 217, so that the metal mould 213 can be prevented from dropping from the depository stand 206. When the metal mould 213 is transferred from the depository stand 206 to the carriage 203, firstly the carriage 203 is moved rightward in FIG. 21 so as to displace the stop cancelling block 239 from the position indicated by the alternate long and two short dashes line to the position indicated by the alternate long and short dash line. Thereupon, the stop lever 237 swings ( refer to the figure indicated by the alternate long and short dash line ) so that the stopper portion 242 is changed over to a retracted posture B to fall in the stop cancelled condition. Thereby, the metal mould 213 becomes movable leftward in FIG. 20.

There is, however, a problem associated with the above-mentioned conventional embodiment.

In the case that many depository stands 206 are juxtaposed to one another in the left and right directions in FIG. 21, when the carriage 203 is moved to the location of the depository stand 206 for which the stop cancellation is going to be carried out, the stop cancelling block 239 cancels temporarily also stopped conditions of other stop levers 237, which stopped conditions are not required to be cancelled, on the way of movement of the carriage 203. It is apprehended that the metal moulds 213 under this condition would drop from the stands 206 when any shock might be imposed to those metal moulds 213.

SUMMARY OF THE INVENTION

It is an object of the present invention to surely prevent a dropping of a metal mould. For accomplishing the object, the present invention has constructed a metal mould dropping prevention device as follows.

A stopping means is provided in one of both end portions of a metal mould depository stand and of a metal mould replacing carriage facing each other and a stop cancelling means is provided in the other thereof. The stopping means is provided with a housing, a stopper member supported by the housing and an actuating member to be connected to the stopper member. The stopper member is so constructed as to be changeable over between a projecting posture in which it project above a lower end of a received portion of a metal mould and a retracted posture in which it is retracted below the lower end thereof. The actuating member is so constructed as to be changeable over between a projecting actuation position in which it changes over the stopping member to the projecting posture and a retracting actuation position in which it changes over the stopping member to the retracted posture. The stop cancelling means is provided with an output portion adapted to be advanced and retracted between the other end portion and the one end portion thereof. The output portion is so constructed as to be changeable over between a return position in which the actuating member is allowed to be changed over to the projecting actuation position by cancelling the engagement with the actuating member and an advanced position in which the actuating member is changed over to the retracting actuation position by engaging with the actuating member.

Incidentally, the stopping means may be provided in the depository stand or in the carriage case by case while the stop cancelling means may be provided in the carriage or in the depository stand corresponding to the aforementioned provision of the stopping means.

The present invention operates, for example as follows.

An operation for taking out the metal mould placed on the depository stand in the stopped condition onto the carriage is carried out by the following procedure. Firstly, the carriage is moved to the location of the depository stand for which the stop cancellation going to be carried out so as to make the output portion of the stop cancelling means face the actuating member of the stopping means. Then, the output portion is advanced from the return position to the advanced position. Thereupon, the actuating member is changed over from the projecting actuation position to the retracting actuation position. At the same time, the stopping member is changed over from the projecting posture to the retracted posture. Thereby, the received portion of the metal mould is allowed to move toward the carriage, so that the metal mould can be transferred.

Since the present invention is constructed and functions as mentioned above, the following advantages can be obtained.

According to the present invention, it becomes possible to cancel a stopped condition of only a specified depository stand or a carriage the stopped condition of which is intended to be cancelled and to surely prevent a dropping of a metal mould without cancelling the stopped conditions of the depository stands or the carriages the stopped conditions of which are not required, differently from the conventional embodiment.

BRIEF DESCRIPTION OF THE DRAWINGS

The above and other objects, advantages and features of the invention will become apparent when considered with the following detailed description of preferred embodiments of the invention, made with reference to the accompanying drawings, in which:

FIG. 1 is a vertical sectional view of a metal mould dropping prevention device, FIG. 1 (A) is a vertical sectional view taken along the I—I arrow line FIG. 3 showing a stop condition and FIG. 1 (B) shows a stop cancelled condition;

FIG. 2 is a plan view of a metal mould replacing system employing the above-mentioned device;

FIG. 3 is a plan view showing a principal portion of the above-mentioned device; FIG. 4 is a view taken along the IV—IV arrow line FIG. 3;

FIG. 5 is a view taken along the V—V arrow line FIG. 3;

FIG. 6 is a view taken along the VI—VI arrow line FIG. 5;

FIG. 7 is a plan view of FIG. 1 (A);

FIG. 13 is a view corresponding to FIG. 3;

FIG. 14 is a sectional view taken along the XIV—XIV arrow line in FIG. 13;

FIG. 15 is a view taken along the XV—XV arrow line FIG. 13;

FIG. 16 is a view corresponding to FIG. 2;

FIG. 17 is a view taken along the XVII—XVII arrow line FIG. 16;

FIG. 18 is a vertical sectional view corresponding to FIG. 1 (A);

FIG. 19 is a plan view corresponding to FIG. 7;

FIG. 20 is a front view; and

FIG. 21 is a view taken along the XXI—XXI arrow line in FIG. 20.

DESCRIPTION OF THE PREFERRED EMBODIMENTS < First Embodiment>

FIGS. 1 through 7 show a first embodiment of the present invention.

Figure 2:
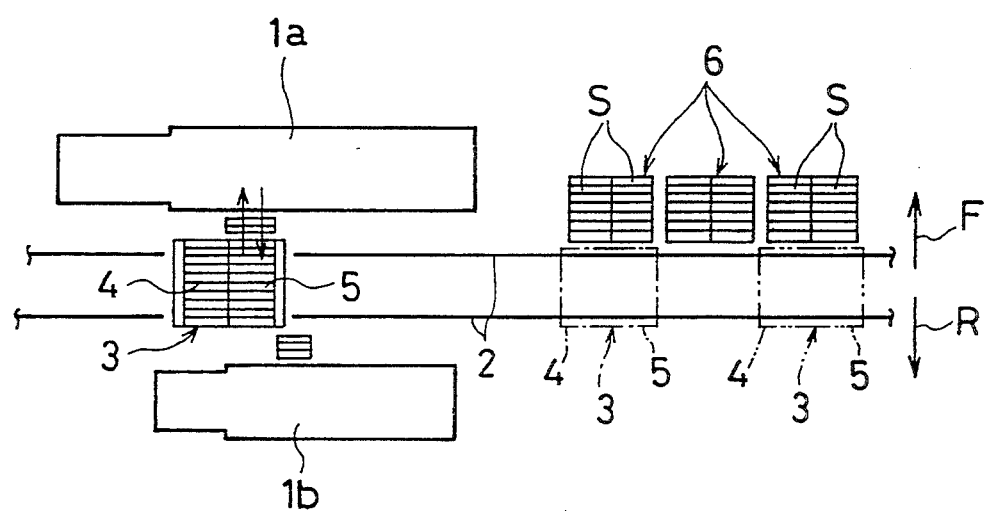

Firstly, a whole construction of a metal mould replacing system will be explained with reference to a plan view of FIG. 2.

Two rails 2 are placed between two different kinds of injection moulding machines 1a, 1b, and a metal mould replacing carriage 3 ( referred to merely as a carriage hereinafter ) provided with two left and right metal mould support surfaces 4, 5 is movable in the left and right directions along the rails 2. A plurality of metal mould depository stands 6 are fixedly secured on a front side F of right end portions of the rails 2. Each depository stand 6 is provided with two left and right metal mould support surfaces S, S.

For example, a replacement of a metal mould ( not illustrated herein ) a using of which has been ended the injection moulding machine 1a carried out by the following procedure. As indicated by the alternate long and short dash line, the carriage 3 is moved along the rails 2 to a location on the rear side R of the stand 6 and then a new metal mould ( not illustrated herein ) put on the left metal mould support surface S of the stand 6 is brought in onto the left metal mould support surface 4 of the carriage 3. As indicated by the solid line, the carriage 3 is moved to the rear side R of the injection moulding machine 1a and a used metal mould the injection moulding machine 1a is brought in onto the right metal mould support surface 5. Then the carriage 3 is moved rightward a predetermined distance so that the new metal mould on the left support surface 4 is brought out to the injection moulding machine 1a. After that, as indicated by the alternate long and two short dashes line, the carriage 3 is moved to a location on the rear side R of the stand 6 and the used metal mould on the right support surface 5 is returned to the right support surface S of the stand 6.

Constructions of the carriage 3 and the metal mould depository stand 6 will be explained with reference to FIG. 1 and FIGS. 3 through 7.

Figure 3:
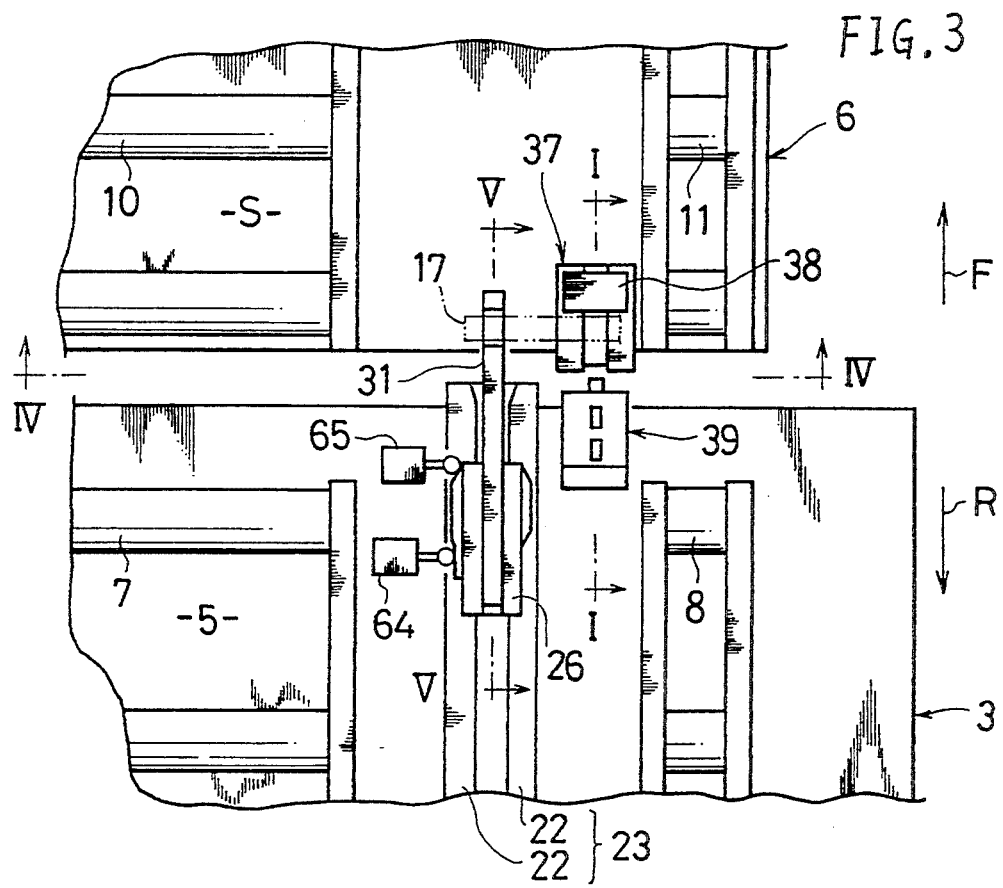
Figure 4:
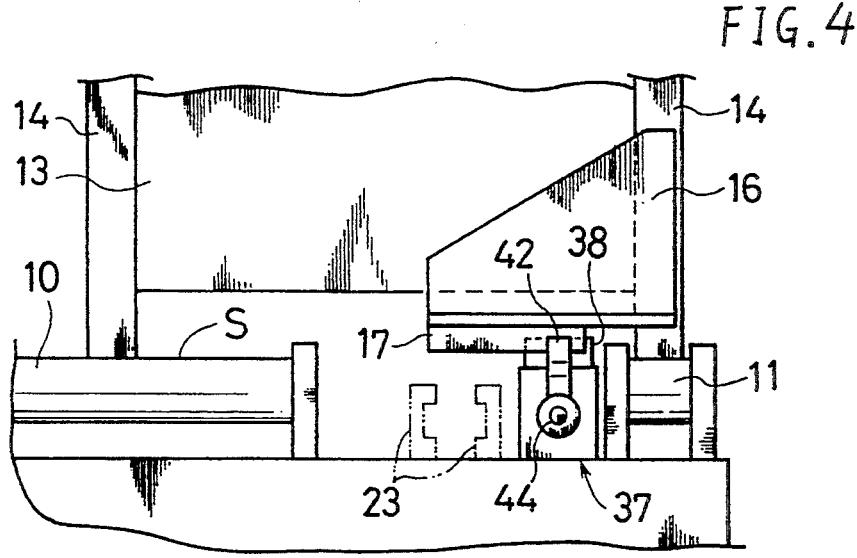

As shown in FIGS. 3 and 4, the right metal mould surface 5 ( and the left metal mould support surface 4 ) of the carriage 3 comprises a group of long rollers 7 on the left side and a group of short rollers 8 on the right side both of which are arranged in parallel in the fore and rear directions ( in the F - R directions shown by the arrows. Also the respective metal mould support surfaces S of the depository stand 6 comprise a group of long rollers on the left group of short rollers 11 on the right side in parallel the fore and rear direction. Metal mould plates 14, 14 are fixedly secured to left and right opposite sides of the metal mould 13 so that their downward projecting portions can be supported movably in the fore and rear directions by the metal mould support surface S.

Figure 5:
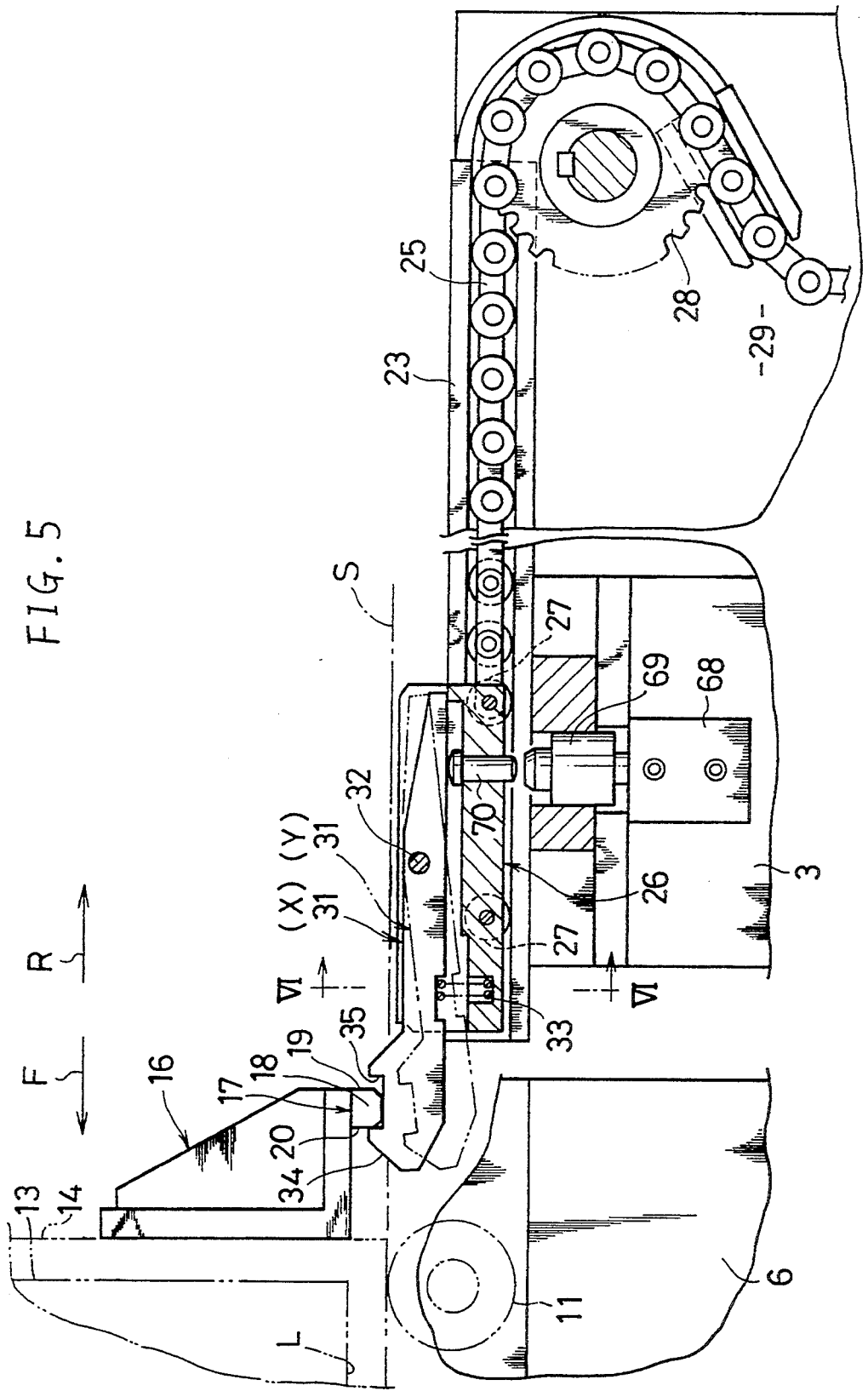
Figure 6:
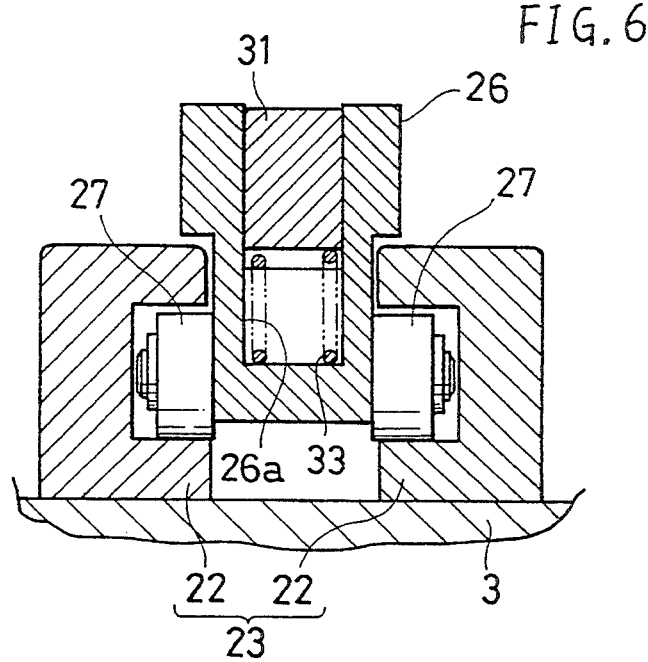

As shown in FIGS. 3 through 5, a L-shaped bracket 16 is fixedly secured to the rear portion of the right metal mould plate 14. A laterally long actuated member 17 fixedly secured to the bottom of the bracket 16 provides a metal mould push-pull driven portion 18, a first received portion 19 for prevention of metal mould backing and a second received portion 20 for prevention of metal mould advancing. The lower end surface of the actuated member 17 is positioned below the lower surface L of the metal mould 13 and above the metal mould support S.

A guide rail 23 comprising two rail members 22, 22 having a C-shaped cross section is fixed on the upper surface of the carriage 3 so as to face each other. A push-pull base 26 adapted to be drivingly pushed and pulled by a chain 25 is inserted in this guide rail 23 movably in the fore and rear directions through front and rear rollers 27, 27 while the chain 25 is adapted to be driven by a sprocket wheel 28 disposed in the rear upper portion of the carriage 30 wheel 28 disposed in the rear upper portion of the carriage 3. Incidentally, the sprocket wheel 28 is rotated by a motor ( not illustrated ). The rear end portion of the chain 25 is adapted to be bent so as to be stored in a storage box 29 within the carriage 3.

A push-pull hook 31 is supported by the push-pull base 26 through a pivot pin 32 so as to be vertically swingable within a receiving groove 26a ( refer to FIG. 6 ) formed in the base 26 and is resiliently urged upward to an engagement position X ( refer to a figure depicted by a solid line in FIG. 5 ) by a spring 33. In the leading end portion of the hook 31, a forward declining cam surface 34 and an engagement groove 35 adapted to be engaged with the driven portion 18 are formed in order from the leading end.

In the rear end portion of the depository stand 6, there are provided a first stopping means 37 for prevention of metal mould backing and a second stopping means 38 for prevention of metal mould advancement. In the front end portion of the carriage 3, there is provided a stop cancelling means 39 facing the first stopping means 37. These respective means 37, 38, 39 are, as shown mainly in FIG. 1, constructed as follows.

A stopper member 42 is supported vertically swingably by the upper portion of a housing 41 of the first stopping means 37 through a pivot pin 43. The stopper member 42 is adapted to be changed over between a projecting posture A (refer to FIG. 1 (A)) in which it projects above the lower end of the first received portion 19 and a retracted posture B (refer to FIG. 1 (B)) in which it retracts below the lower end. A piston-like actuating member 44 is supported movably in the fore and rear directions in the lower portion of the housing 41. The actuating member 44 is connected to the stopper member 42 and adapted to be changed over between a projecting actuation position C (refer to FIG. 1 (A)) in which it changes over the stopper member 42 to the projecting posture A and a retracting actuation position D (refer to FIG. 1 (B)) in which it changes over the stopper member 42 to the retracted posture B. Incidentally, the actuating member 44 is prevented by a stopping pin 45 from projecting beyond the rear surface of the housing 41.

Under the stopped condition shown in FIG. 1 (A), an actuating flange 46 of the actuating member 44 is urged resiliently to the projecting actuation position C by a spring 47 so as to raise up an actuated portion 42a of the stopper member 42 from below. Thereby, a stopper portion 42b of the stopper member 42 swings upward so as to prevent a backing of the actuated member 17. To the contrary, under the stop cancelled condition shown in FIG. 1 (B), the actuating flange 46 enters a release groove 48 of the stopper member 42. Thereby, the stopper portion 42b is allowed to swing downward, so that a retraction of the actuated member 17 can be allowed.

The second stopping means 38 is fixedly secured to the upper portion of the housing by two bolts 49 (refer to FIG. 7) and is faced to the actuated member 17 from the front side F.

Figure 7:
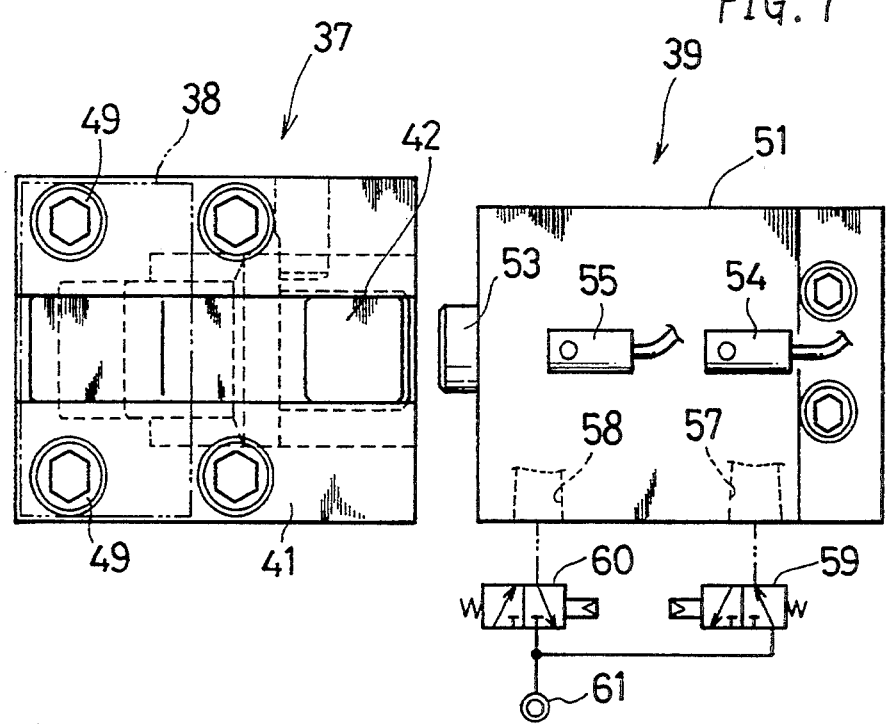

The stop cancelling means 39 is provided with a pneumatic cylinder 51. An output portion 53 is provided at a front end of a piston rod 52 of the cylinder 51 so as to be opposed to the actuating member 44. The output portion 52 is adapted to be changed over between a returned position G (refer to FIG. 1 (A)) in which it changes over the actuating member 44 to the projecting actuation position C and an advanced position H (refer to FIG. 1(B)) in which it changes over the actuating member 44 to the retracting actuation position D. The symbol 54 designates a return detecting switch and the symbol 55 designates an advancement detecting switch. As shown in FIG. 7, both a first supply/discharge port 57 and a second supply/discharge port 58 of the cylinder 51 are adapted to be connected selectively to a pneumatic source 61 through switching valves 59, 60 respectively.

A procedure for transferring the metal mould 13 between the carriage 3 and the depository stand 6 will be explained hereinafter.

Under such a condition that the metal mould 13 is deposited on the metal mould support surface S of the stand 6, a forward movement of the mold 13 is prevented by the second stopping means 38. A pressurized air is discharged from the first supply/discharge port 57 of the cylinder 51 as well as the pressurized air is supplied to the second supply/discharge port 58. Thereupon, as shown in FIG. 1 (A), the output portion 53 is retracted to the returned position G so that the actuating member 44 is changed over to the projecting actuation position C and then the stopper member 42 is changed over to the projecting posture A. Thereby, a movement of the actuated member 17 toward the rear side R is prevented. As a result, the metal mould 13 can be precisely located in a predetermined position in the fore and rear directions. At this time, the push-pull base 26 has been retracted to a location of the rear side R on the carriage 3.

An operation for transferring the metal mould 13 on the depository stand 6 onto the carriage 3 is carried out according to the following procedure.

Firstly, when the carriage 3 is moved to a location on the rear side R of the depository stand 6 and the stop cancelling means 39 of the carriage 3 reaches a location where it faces the first stopping means 37 of the stand 6, the carriage 3 is stopped in place. Then, the pressurized air is discharged from the second supply/discharge port 58 of the cylinder 51 and the pressurized air is supplied to the first supply/discharge port 57. Thereupon, as shown in FIG. 1 (B), the output portion 53 is advanced to an advanced position H, so that the actuating member 44 is changed over to the retracting actuation position D and the stopper member 42 is changed over to the retracted posture B. Thereby, the actuated member 17 is allowed to move toward the rear side R.

Then, when the sprocket wheel 28 (refer to FIG. 5) is rotated counterclockwise by a motor (not illustrated), the push-pull base 26 on the carriage 3 is advanced toward the front side F. Together with the advancement of the pushpull base 26, firstly the cam surface 34 of the push-pull hook 31 is brought into contact with the lower surface of the driven portion 18 of the plate 14 and then the leading end of the hook 31 is swung downward against a resilient force of the spring 33 by a downward reaction force acting from the driven portion 18 to the cam surface 34. Subsequently thereto, when the engagement groove 35 of the hook 31 is moved to the location of the driven portion 18 by the advancement of the push-pull base 26, the leading end of the hook 31 is swung upward by the resilient force of the spring 33, the engagement groove 35 is engaged with the driven portion 18.

By the way, just before the advancement of the hook 31 to the engagement position, a first limit switch 64 shown in FIG. 3 serves to reduce a speed of the aforementioned motor (not illustrated) so as to reduce an advancing speed of the push-pull base 26. At the time of the advancement to the aforementioned engagement position, a second limit switch 65 shown in FIG. 3 detects the advancement position of the push-pull base 26 so as to stop the revolution of the motor.

By moving the push-pull base 26 to the rear side R under the aforementioned engaged condition, the metal mould 13 on the depository stand 6 is pulled out onto the carriage 3. After that, the pressurized air is discharged from the first supply/discharge port 57. Thereupon, the actuating member 44 is changed over to the projecting actuation position C by a spring 47 of the first stopping means 37 and the stopper member 42 is changed over to the projecting posture A. At the same time, the piston rod 52 of the stop cancelling means 39 is retracted to the position depicted by the alternate long and two short dashes line in FIG. 1(B). When a return detecting switch 54 detects this retraction, the pressurized air is supplied to the second supply/discharge port 58 so as to retract the piston rod 52 to the rearmost end. After that, the positioning of the carriage 3 is cancelled and the carriage 3 is moved to the location of the injection moulding machine 1a or 1b.

Incidentally, an operation for transferring the metal mould 13 on the carriage 13 to the depository stand 6 is carried out by a substantially reverse procedure relative to the above-mentioned procedure.

Figure 1A:
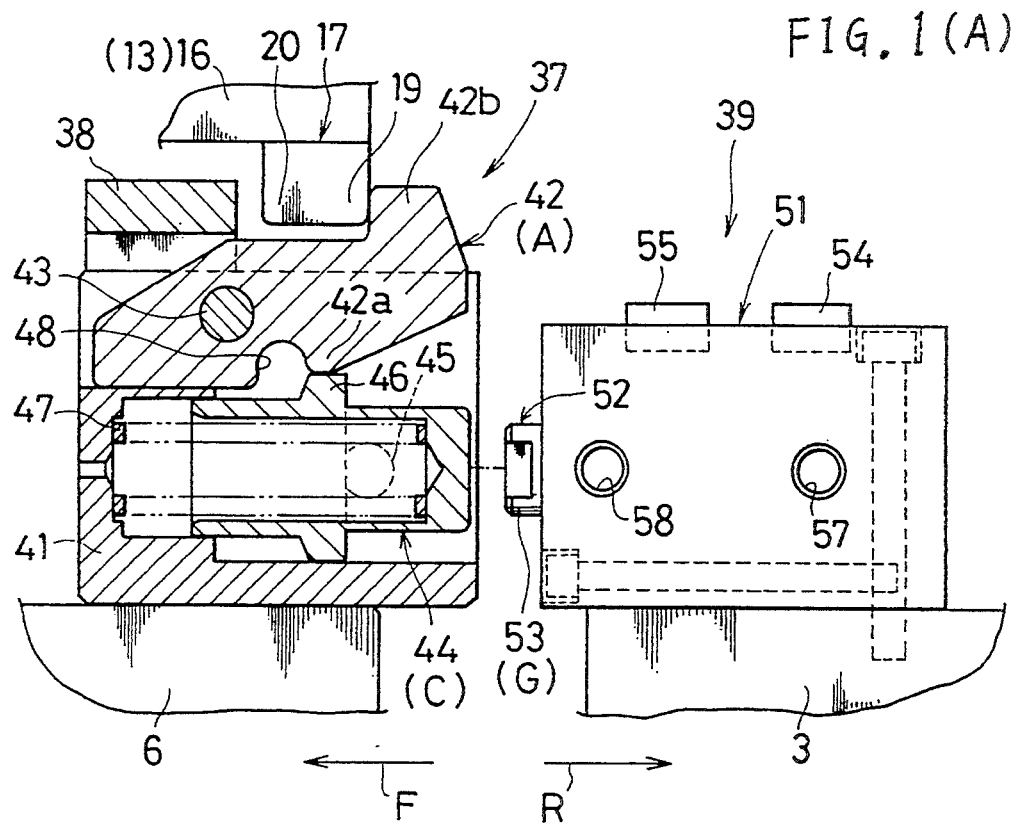
FIGS. 1 through 7 show a first embodiment of the present invention.
Figure 1B:
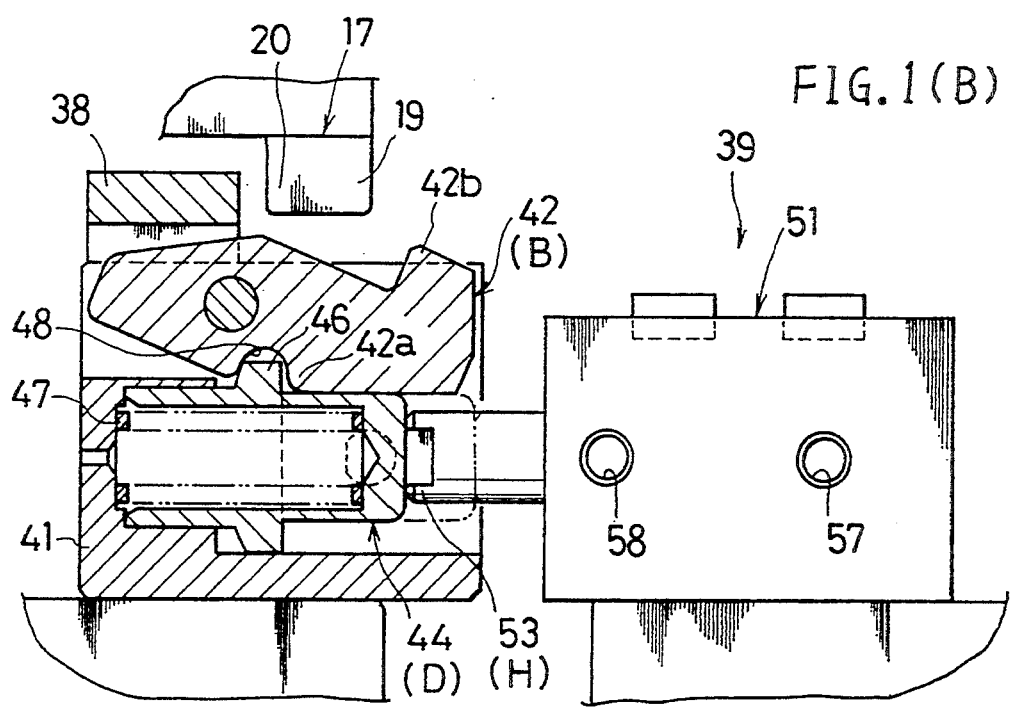

That is, the stop cancelling means 39 of the carriage 3 is made to face the first stopping means 37 of the depository stand 6 and, as shown in FIG. 1 (B), an output portion 53 of the stop cancelling means 39 is made to advance so as to change over the first stopping means 37 to the stop cancelled condition. Then, the push-pull base 26 is made to advance from the side of the carriage 3 to the side of the stand 6 so as to transfer the metal mould 13 to the stand 6. Subsequently, as shown FIG. 1 (A), the stop cancelling means 39 is made to contract so as to change over the first stopping means 37 to the stop condition. Thereby, a fore and rear movement of the metal mould 13 is prevented by those two stopping means 37, 38, so that the mould 13 can be positioned precisely on the stand 6.

Under the above-mentioned condition, a pneumatic actuator 68 ( refer to FIG. 5 ) fixedly secured to the carriage 3 is made to extend so as to raise a push pin 70 of the push-pull base 26 by means of a pushing member 69. Thereby, as indicated by the alternate long and two short dashes line in FIG. 5, the leading end of the hook 31 swings downward so as to be changed over to an engagement cancelled position Y which is lower than the lower end surface of the driven portion 18. Under this condition, the sprocket wheel 28 is driven clockwise. Thereby, the push-pull base 26 is pulled to the rear side R by the chain 25, so that the engagement between the engagement groove 35 and the driven portion 18 can be cancelled. Subsequently, the push-pull base 26 is moved to the rear side of the carriage 3.

The following advantages can be obtained by the device having the above-mentioned construction.

It is possible to carry out the stop cancellation of only the specified depository stand 6, the stopped condition of which is intended to be cancelled, of a plurality of depository stands 6 juxtaposed in the right and left directions while differently from the conventional embodiment, the stop cancellations of other stands thereof, which are not required, are never caused. Therefore, it becomes possible to surely prevent a dropping of the metal mould.

Since the position G or H of the output portion 53 can be detected by detecting the advanced and retracted positions of the piston rod 52 of the stop cancelling means 39 by means of two detecting switches 54, 55, the posture A or B of the stopper member 42 can be detected. As a result, it becomes possible to inexpensively manufacture such a device as to detect whichever the metal mould 13 is in the stopped condition or in the stop cancelled condition.

Utilities such as a pneumatic piping and an electrical wiring required for the stop cancelling means 39 are provided only in the carriage 3 but not required to be provided in each of many depository stands 6. Therefore, it is not necessary to provide a pneumatic piping and an electrical wiring in a factory, so that a whole of the system can be constructed simple as well as a utility cost can be decreased. Further, when the number of the depository stand 6 is required to be increased, merely the mechanical stopping means 37 is provided additionally in the stand 6 to be added and the aforementioned utilities are not required to be provided additionally. Therefore, the additional working becomes and inexpensive. Furthermore, since a test running of the carriage 3 is possible under the condition provided with such utilities in the manufacturer factory, a linking operation and an adjustment with respect to the stands 6 in an installation site is not necessary or becomes easy.

Incidentally, the above-mentioned first embodiment can be modified as follows.

Since the aforementioned chain 25 may perform a push-pull driving and bend so as to be stored, also it can be replaced by a belt and a wire.

All the driven portion 18, the first received portion 19 and the second received portion 20 may be constructed also by other members.

The metal mould support surface S of the depository stand 6 may be only one or at least three.

FIGS. 8 through 19 show a second embodiment through a ninth embodiment of the present invention. In the respective embodiments, component members having the same functions as those in the first embodiment are designated by the same symbols, in principle.

< Second Embodiment>

Figure 8:
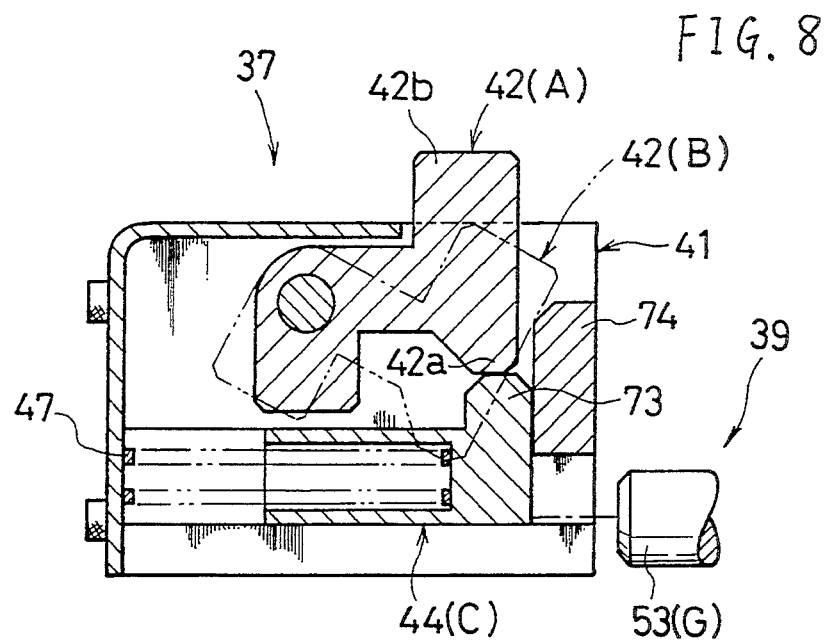
FIG. 8 shows a second embodiment of the present invention and corresponding to FIG. 1 (A)

FIG. 8 shows the second embodiment.

An actuating projection 73 is projected upward from the right end of the actuating member 44. The actuating member 44 in the projecting actuation position C and the stopper member 42 in the retreated posture B are adapted to be received by a block 74 formed in the housing 41.

< Third Embodiment>

Figure 9:
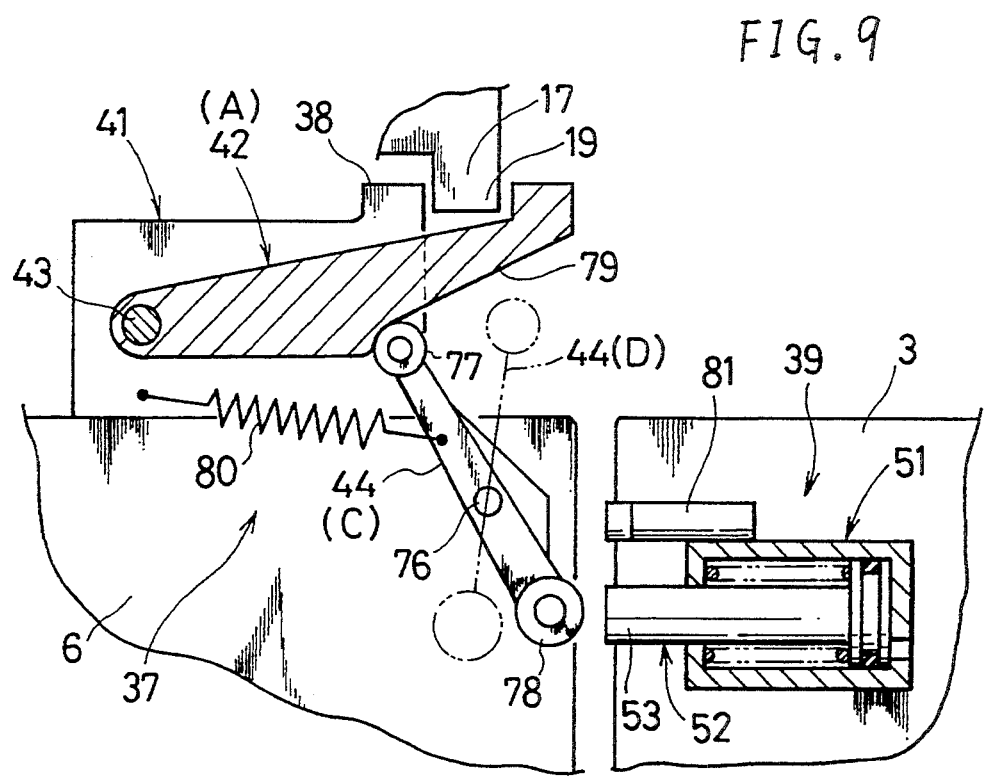
FIG. 9 shows a third embodiment of the present invention and is a view corresponding to FIG. 1 (A)

FIG. 9 shows the third embodiment.

The left end of the stopper member 42 of the first stopping means 37 is supported vertically swingably by the block-like housing 41 through the pivot pin 43. The lever-like actuating member 44 is supported at its middle portion by another pivot pin 76 and provided at its upper end with an actuating roller 77 and at its lower end with an actuated roller 78 respectively. The actuating roller 77 is adapted to be brought into contact with an actuated inclined surface 79 of the stopper member 42. The second stopping means 38 is formed integrally with the housing 41.

When the actuating member 44 is changed over from the projecting actuation position C depicted by the solid line to the retracting actuation position D depicted by the alternate long and two short dashes line against a tension spring 80 through the output portion 53 by advancing the piston rod 52 of the stop cancelling means 39, the stopper member 42 is swung downward from the projecting posture A to the retracted posture. The respective positions C, D of the actuating member 44 are adapted to be detected by a photoelectric switch 81 disposed in the cylinder 51.

< Fourth Embodiment>

Figure 10:
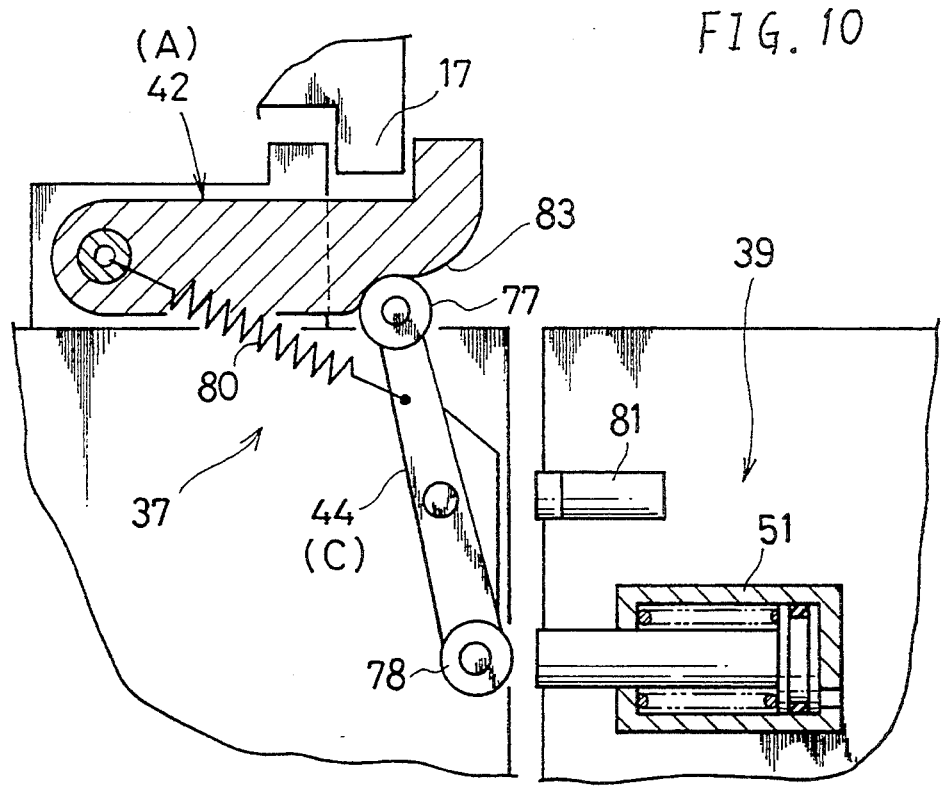
FIG. 10 shows a fourth embodiment of the present invention and is a view corresponding to FIG. 1 (A)

FIG. 10 shows a fourth embodiment, which is obtained by modifying the embodiment shown in FIG. 9 as follows. That is, the actuated portion of the stopper member 42 is constructed by a cam surface 83, and a mounting position of the tension spring 80 is changed.

< Fifth Embodiment >

Figure 11:
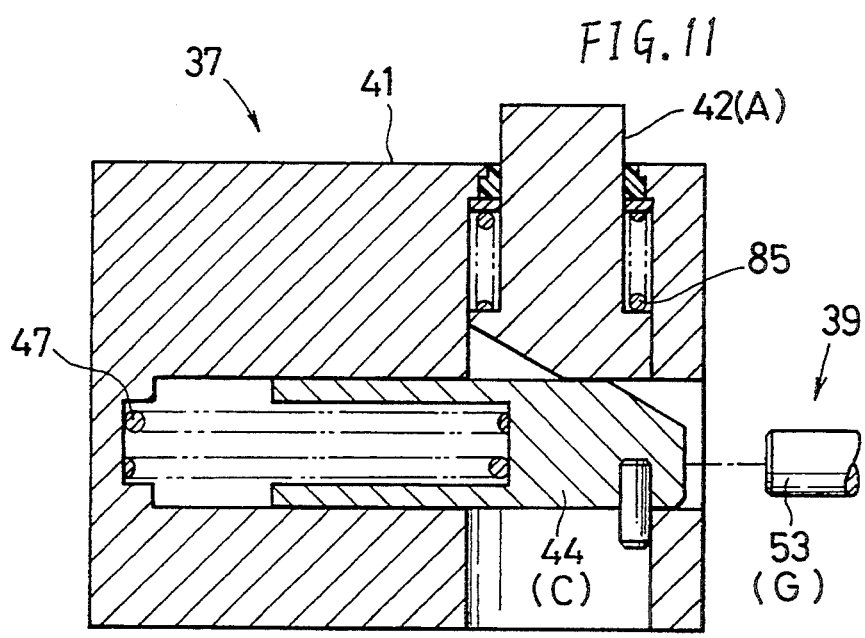
FIG. 11 shows a fifth embodiment of the present invention and is a view corresponding to FIG. 1 (A)

FIG. 11 shows a fifth embodiment.

The stopper member 42 is inserted vertically movably into the upper portion of the housing 41. When the actuating member 44 is changed over from the illustrated projecting actuation position C to the retracting actuation position on the left side by the output portion 53 of the stop cancelling means 39, the stopper member 42 is changed over from the illustrated projecting posture A to the retracted posture on the lower side by a retracting spring 85 of the stopper member 42.

< Sixth Embodiment >

Figure 12:
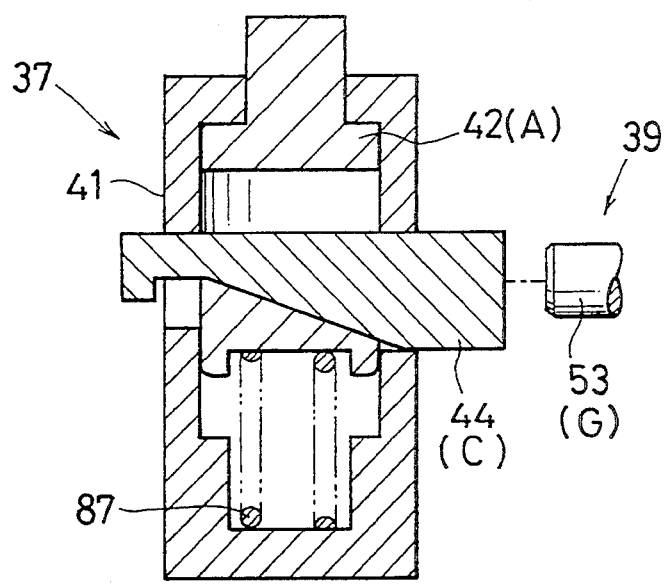
FIG. 12 shows a sixth embodiment of the present invention and is a view corresponding to FIG. 1 (A)

FIG. 12 shows a sixth embodiment.

Similarly to the embodiment shown in FIG. 11, the stopper member 42 is inserted vertically movably into the housing 41. When the actuating member 44 is changed over from the illustrated projecting actuation position C to the retracting actuation position on the left side by the output portion 53 of the stop cancelling means 39, the stopper member 42 is changed over from the illustrated projecting posture A to the retracted posture on the lower side against a projecting spring 87. In this sixth embodiment, even when the metal mould collides against the stopper member 42 from above by mistakes, since the stopper member 42 is allowed to lower against the projecting spring 87, a damage of the first stopping means 37 can be prevented.

< Seventh Embodiment >

Figure 13:
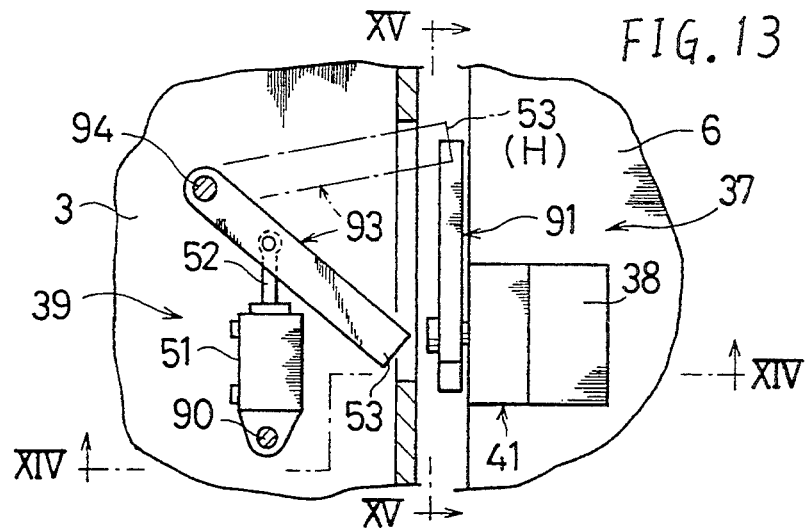
FIGS. 13 through 15 show a seventh embodiment of the present invention.
Figure 14:
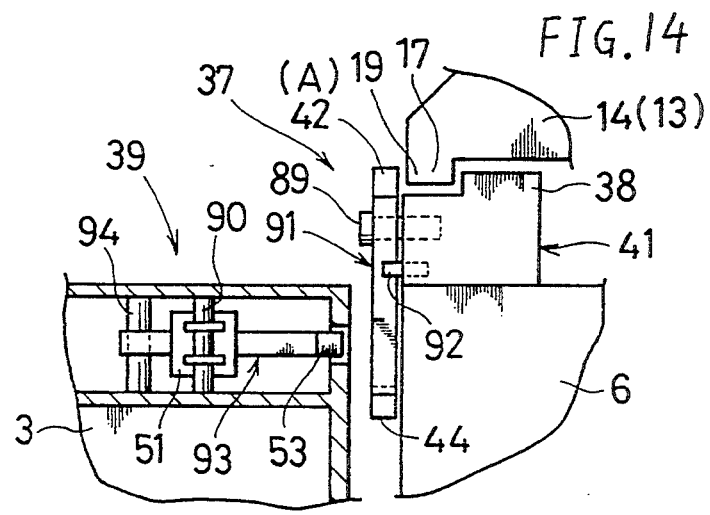
Figure 15:
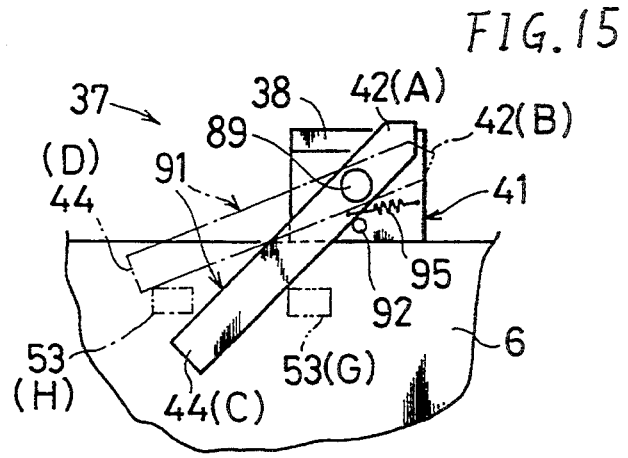

FIGS. 13 through 15 show a seventh embodiment.

The first stopping means 37 has a lever 91 supported vertically swingably by the block-like housing 41 through a pin 89. The lever 91 is provided at its upper end with the stopper member 42 and at its lower portion with the actuating member 44. The symbol 92 designates a swing restricting pin. The second stopping means 38 is formed integrally with the housing 41.

The stop cancelling means 39 provided with the pneumatic cylinder 51. The cylinder 51 is supported at its one end by a pivot pin 90 while its piston rod 52 connected at its leading end to a middle portion output lever 93. A base end portion of the lever 93 is supported by a pivot pin 94, and the lever 93 is provided at its leading end with the output portion 53.

When the cylinder 51 is extended from the illustrated contracted condition, the output portion 53 of the output lever 93 is changed over from the return position G (depicted by the alternate long and two short dashes line in FIG. 15 ) to the advanced position H ( depicted by the long and short dash line in FIG. 15 ). Thereupon, the actuating member 44 is changed over from the projecting actuation position C ( depicted by the solid line in FIG. 15 ) to the retracting actuation position ( depicted by the long and short dash line in FIG. 15 ) against a spring 95 while the stopper member 42 changed over from the projecting posture A ( depicted by the solid line in FIG. 15 ) to the retracted posture B ( depicted by the alternate long and short dash line in FIG. 15 ).

Also in this seventh embodiment, even when the metal mould collides against the stopper member 42 from above by mistakes, since the stopper member 42 is allowed to swing downward, a damage of the first stopping means 37 can be prevented.

< Eighth Embodiment >

Figure 17:
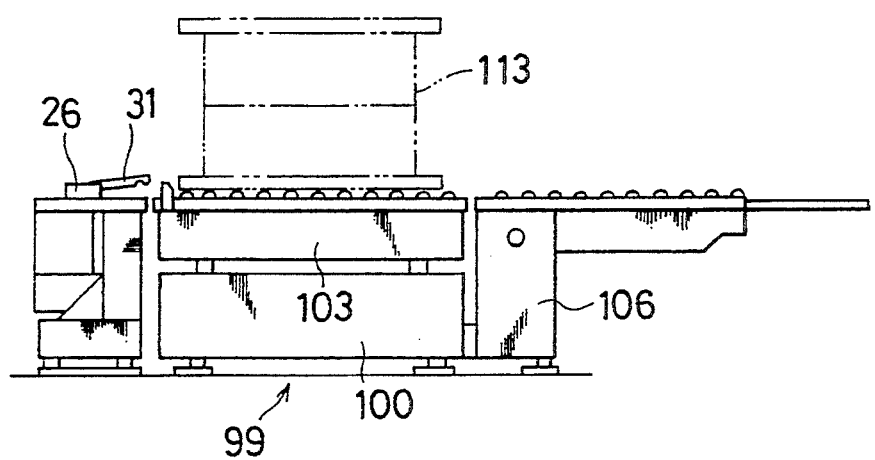
FIGS. 16 and 17 show an eighth embodiment of the present invention.
Figure 16:
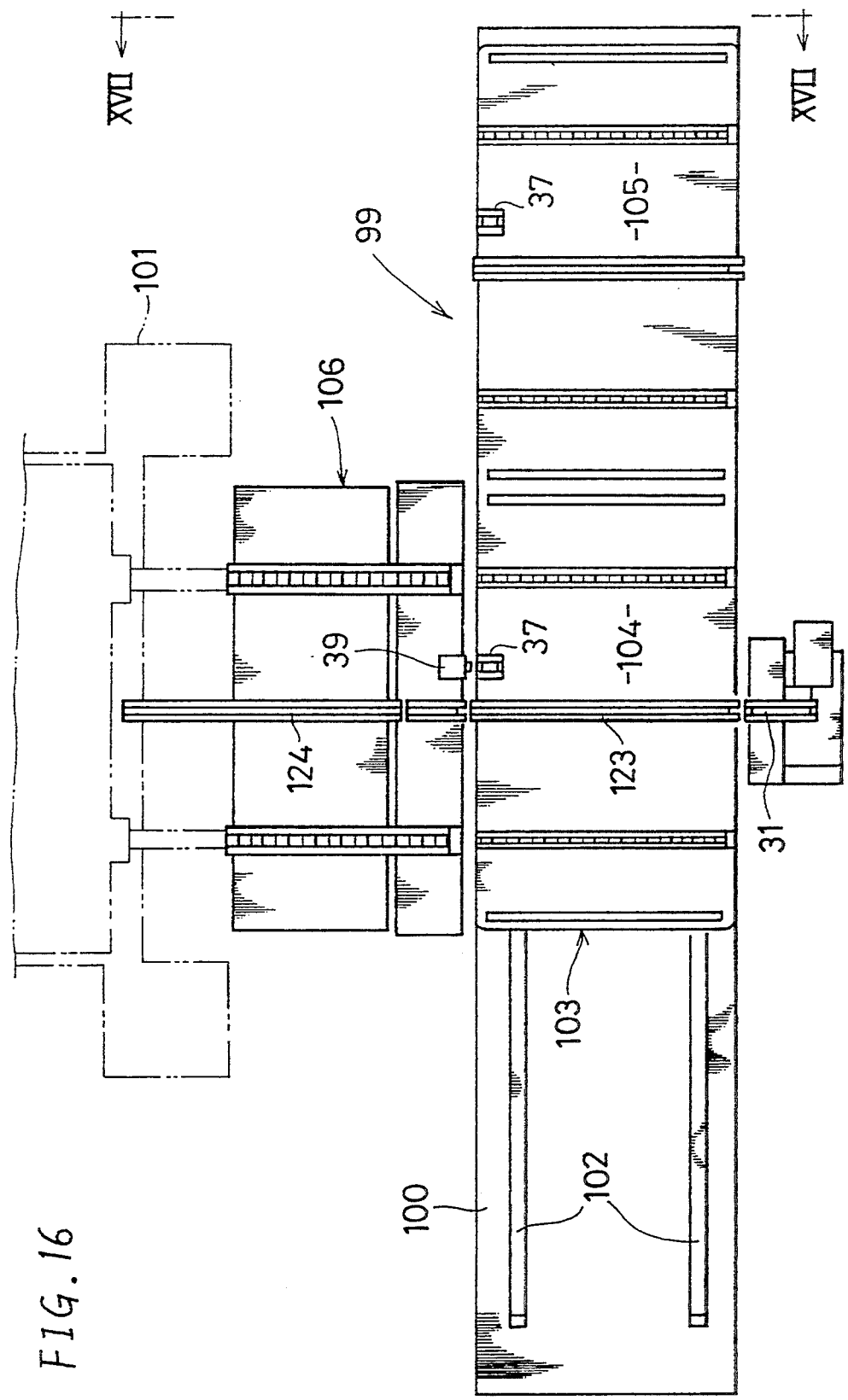

FIGS. 16 and 17 show an eighth embodiment.

A shuttle device 99 is disposed behind a press machine 101. A carriage 103 is mounted movably in the left and right directions to rails 102 placed on a base 100 of the shuttle device 99. A metal mould 113 is adapted to be supported on left and right metal mould support surfaces 104, 105 of the carriage 103. The support surfaces 104, 105 are provided at their front ends with the first stopping means 37 respectively. A metal mould depository stand 106 is disposed between the push/pull 103 and the press machine 101. The stop cancelling means 39 is disposed at the rear end of the depository stand 106. These first stopping means 37 and stop cancelling means 39 are constructed substantially similarly to those of the first embodiment of FIG. 1.

Incidentally, the push-pull base 26 is adapted to be advanced and retracted along guide rails 123, 124 placed on the carriage 103 and the depository stand 106 respectively. The hook 31 supported by the push-pull base 26 is adapted to be engaged with the driven portion ( not illustrated) of the metal mould 113 from above.

When the present invention is applied to the press machine in that way, the second stopping means 38 employed in the first embodiment can be omitted.

< Ninth Embodiment >

Figure 18:
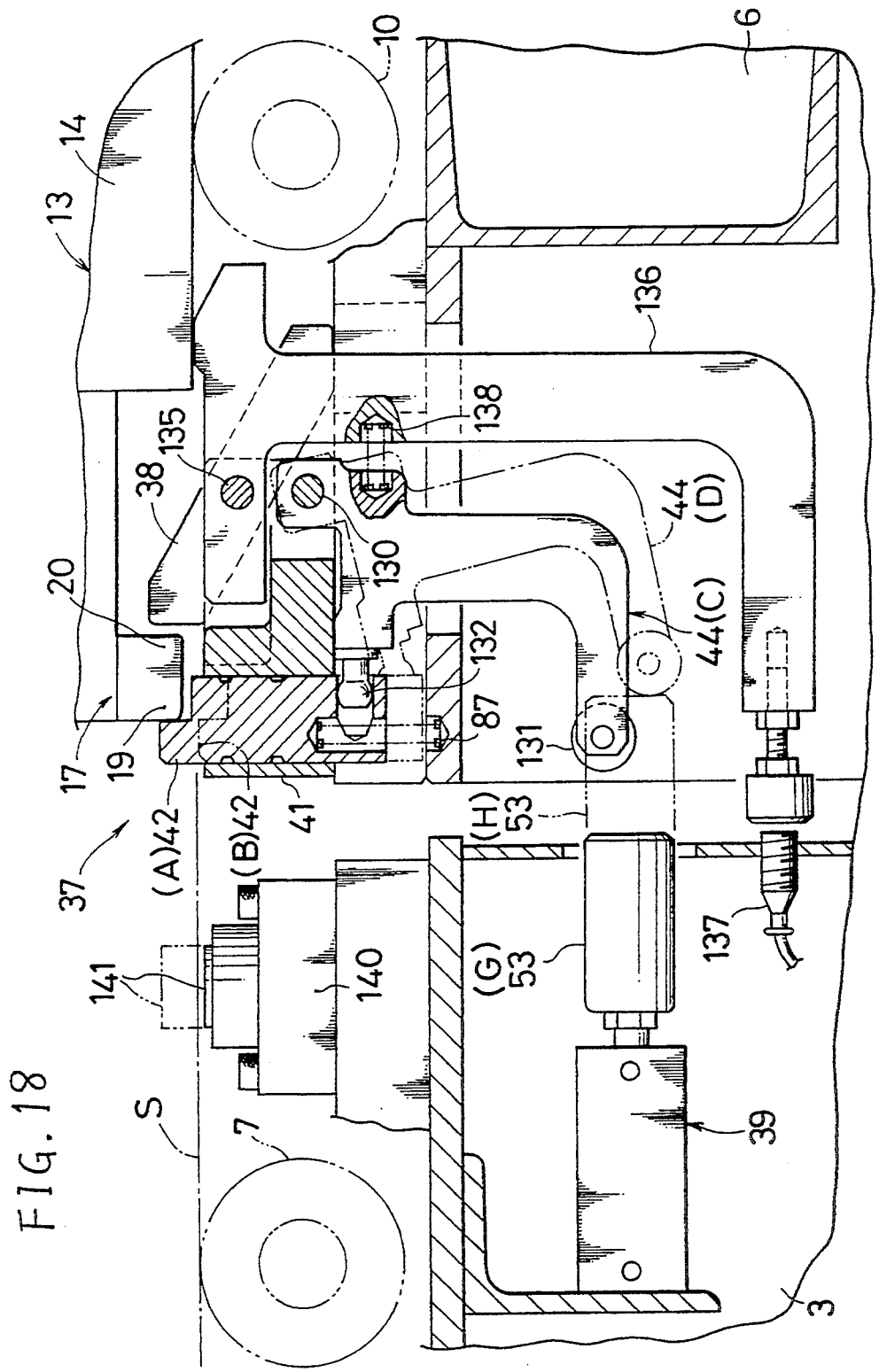
FIGS. 18 and 19 show a ninth embodiment of the present invention.
Figure 19:
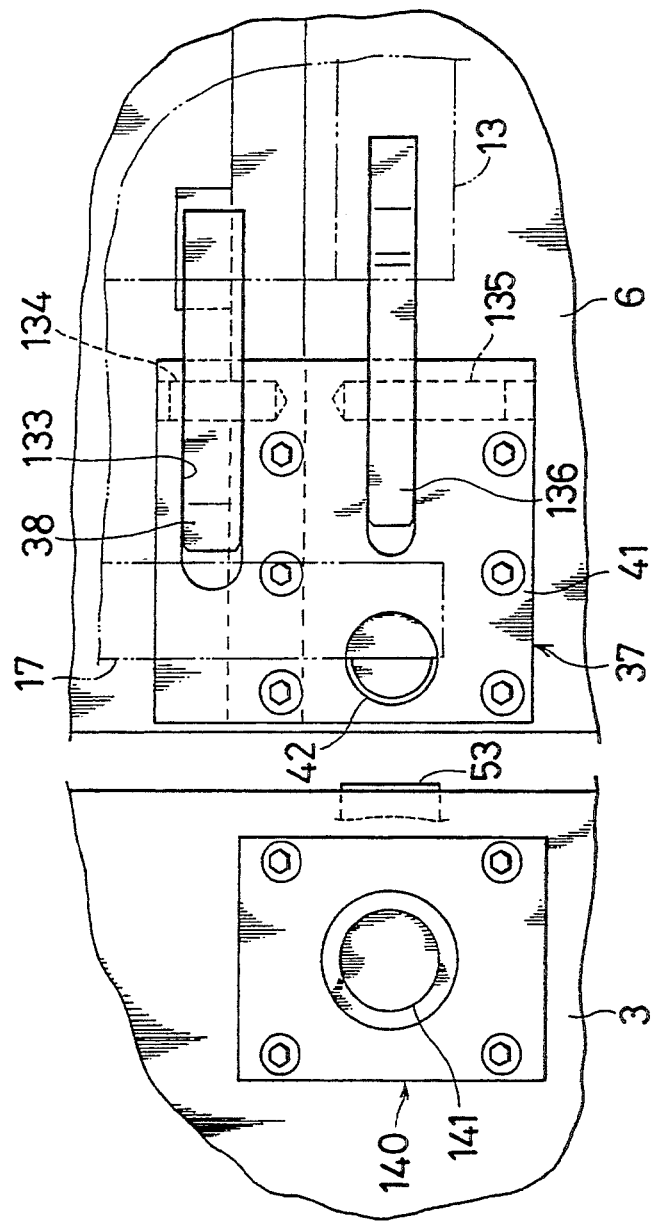
Figure 20:
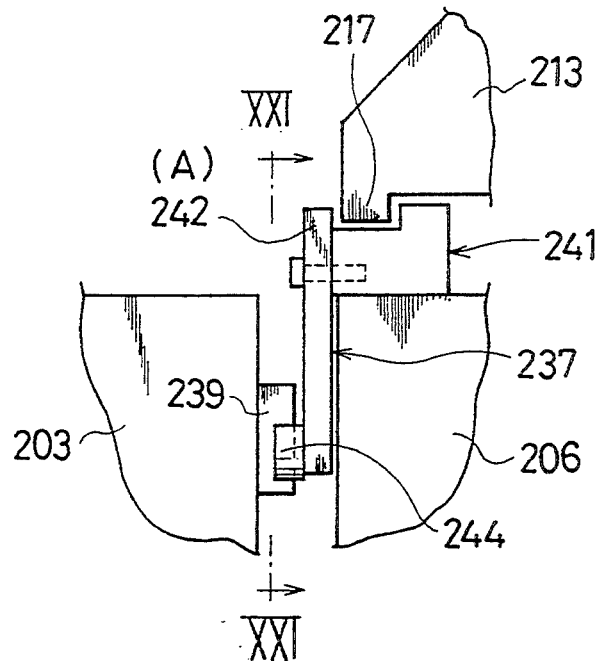
FIGS. 20 and 21 show a conventional embodiment.
Figure 21:
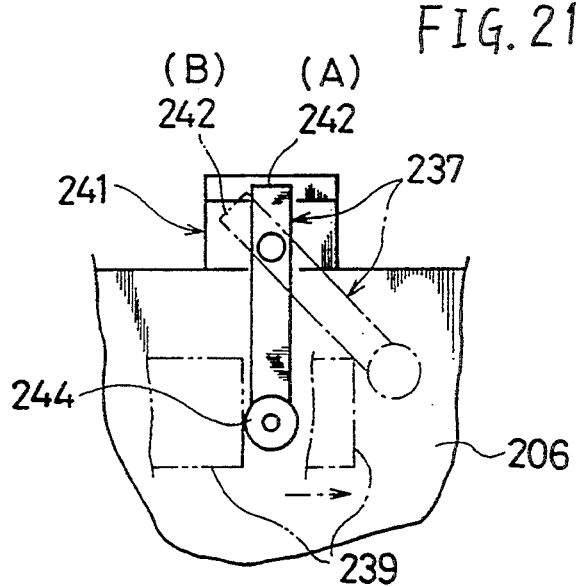

FIGS. 18 and 19 show a ninth embodiment.

The symbol 3 designates the carriage, and the symbol 6 designates the depository stand. the stopper member 42 is supported vertically movably between the projecting posture A and the retracted posture B by the housing 41 of the first stopping means 37. The stopper member 42 is resiliently urged to the projecting posture A by the projecting spring 87. The actuating member 44 is formed in the J-configuration. The actuating member 42 is supported at its upper right portion by the housing 41 through a pin 130 so as to be vertically swingable. A roller 131 is provided in the lower left portion of the actuating member 44 so as to face the output portion 53 of the stop cancelling means 39. A spherical coupling 132 projected leftward from the upper portion of the actuating member 44 is connected to the stopper member 42.

Under the stop condition depicted by the solid line in FIG. 18, since the output portion 53 of the stop cancelling means 39 has been changed over to the return position G, the stopper member 42 is changed over to the projecting posture A by the spring 87 as well as the actuating member 44 is changed over to the projecting actuation position C. As depicted by the alternate long and two short dashes line in Fig. 18, when the output portion 53 is changed over to the advanced position H at the time of the stop cancellation, the actuating member 44 is swung downward so as to be changed over to the retracting actuation position D. Thereby, the stopper member 42 is changed over to the retracted posture B.

The second stopping means 38 is provided in an opposed position to the stopper member 42 with respect to the received portion 19 of the metal mould 13. This second stopping means 38 is supported vertically swingably by a groove 133 of the housing 41 through a pin 134 under such a condition as to be able to project above the lower end of the received portion 19 by its own gravity or a spring.

Further, the depository stand 6 is provided with a means for detecting a support of the metal mould 13 thereon. This means is provided with a J- shaped arm 136 supported vertically swingably by the housing 41 through a pin 135 and a proximity switch 137 mounted to the carriage 3. When the mould 13 is supported by the stand 6, the arm 136 is swung clockwise as shown in FIG. 18, so that the left lower portion of the arm 136 faces the proximity switch 137. Since the support of the mould 13 on the stand 6 can be detected by a detection signal of this switch 137, a mistaken transfer of a new mould from the carriage 3 to the stand 6 can be prevented. Incidentally, when any mould doesn't exist on the stand 6, the arm 136 is swung counterclockwise by a spring 138.

Further, in the upper portion of the carriage 3 there may be provided an air cylinder 140 serving as the metal mould dropping prevention device on the side of the carriage. A piston rod 141 of the cylinder 140 adapted to project above the metal mould support surface S.

According to this ninth embodiment, even when the metal mould 13 collides against the stopper member 42 from above by mistake at the time of putting the mould 13 onto the depository stand 6 by a crane and so on, since the stopper member 42 is allowed to lower against the projecting spring 87, a damage of the first stopping means 37 can be prevented. Further, even when the mould collides against the second stopping means 38 from above by mistake, since the second stopping means 38 can be swung downward, its damage can be prevented. Since the proximity switch 137 mounted to the carriage 3 is adapted to detect whether the mould exists on the stand 6 or not, it is not necessary to provide an electrical wiring in the stand 6.

In the respective above-mentioned embodiments, the stop cancelling means 39 may be an electric actuator such as a solenoid and a motor instead of the air cylinder.

It will be apparent from the foregoing that, while particular forms of the invention have been illustrated and described, various modifications can be made within the spirit and scope of the invention.

What is claimed is:

1. A mould dropping prevention device comprising:
    a mould depository stand (6);
    a mould replacing carriage (3) facing said depository stand (6), said carriage (3) adapted to transfer a mould (13), said mould (13) having a received portion (19);
    means for selectively stopping said mould (37) including a housing (41), a stopper member (42) and an actuating member (44), said stopping means being fixed to an end portion of said stand (6) so as to prevent relative movement between the housing (41) and the stand (6);
    means for selectively actuating said stopping means (39) fixed to an end portion of said carriage (3) and including an output portion (53) adapted to be advanced and retracted between the end portion of the carriage (3) and the end portion of the stand (6);
    said stopper member (42) being supported by said housing (41) and adapted to be changed over between a projecting posture (A) in which it is engaged with the received portion (19) of said mould (13) and a retracted posture (B) in which it is disengaged from the received portion (19) of said mould (13);
    said actuating member (44) being connected to said stopper member (42) and adapted to be changed over between a projecting actuation position (C) in which it changes over the stopper member (42) to said projecting posture (A) and a retracting actuation position (D) in which it changes over the stopper member (42) to said retracted posture (B); and
    said output portion (53) being adapted to be changed over between a return position (G) in which it cancels an engagement with said actuating member (44) so that the actuating member (44) is allowed to be changed over to said projecting actuation position (C) and an advanced position (H) in which it engages with the actuating member (44) so as to change over the actuating member (44) to said retracting actuation position (D).

2. The dropping prevention device as set forth in claim 1, wherein said output portion (53) is adapted to be advanced and retracted linearly between the end portion of the carriage (3) and the end portion of stand (6).

3. The dropping prevention device as set forth in claim 2, wherein the stopper member (42) is supported movably by said housing (41) and there is provided a projecting spring (87) which serves to resiliently urge said stopper member (42) to said projecting posture (A).

4. The dropping prevention device as set forth in claim 3, wherein said actuating member (44) is so formed as to extend in a first direction and a first portion thereof is supported swingably by said housing (41), a second portion thereof is made to face said output portion (53) and a mid-way portion thereof is connected to the stopper member (42).

5. The dropping prevention device as set forth in claim 3, wherein a second means for selectively stopping movement of said mould (38) is disposed in an opposed position to said stopper member (42) with respect to the received portion (19) of said mould (13), and said second means for stopping (38) is supported swingably by said housing (41) under such a condition as to be engageable with said received portion (19).

6. A mould dropping prevention device comprising:
    a mould depository stand (6);
    a mould replacing carriage (3) facing said depository stand (6), said carriage being adapted to transfer a mould (13), said mould (13) having a received portion (19);
    means for selectively stopping said mould (37) including a housing (41), a stopper member (42) and an actuating member (44), said stopping means being fixed to an end portion of said carriage (3) so as to prevent relative movement between the housing (41) and the carriage (3);
    means for selectively actuating said stopping means (39) fixed to an end portion of said stand (6) and including an output portion (53) adapted to be advanced and retracted between the end portion of the stand (6) and the end portion of the carriage (3);
    said stopper member (42) being supported by said housing (41) and adapted to be changed over between a projecting posture (A) in which it is engaged with the received portion (19) of said mould (13) and a retracted posture (B) in which it is disengaged from the received portion (19) of said mould (13);

said actuating member (44) being connected to said stopper member (42) and adapted to be changed over between a projecting actuation position (C) in which it changes over the stopper member (42) to said projecting posture (A) and a retracting actuation position (D) in which it changes over the stopper member (42) to said retracted posture (B); and said output portion (53) being adapted to be changed over between a return position (G) in which it cancels an engagement with said actuating member (44) so that the actuating member (44) is allowed to be changed over to said projecting actuation position (C) and an advanced position (H) in which it engages with the actuating member (44) so as to change over the actuating member (44) to said retracting actuation position (D).

7. The dropping prevention device as set forth in claim 6 wherein said output portion (53) is adapted to be advanced and retracted linearly between the end portion of the stand (6) and the end portion of the carriage (3).

8. The dropping prevention device as set forth in claim 7, wherein the stopper member (42) is supposed movably by said housing (41) and there is provided a projecting spring (87) which serves to resiliently urge said stopper member (42) to said projecting posture (A).

9. The dropping prevention device as set forth in claim 8, wherein said actuating member (44) is so formed as to extend in a first direction and a first portion thereof is supposed swingably by said housing (41), a second portion thereof is made to face said output potion (53) and a mid-way portion thereof is connected to the stopper member (42).

10. The dropping prevention device as set forth in claim 8, wherein a second means for selectively stopping movement of said mould (38) is disposed in an opposed position to said stopper member (42) with respect to the received portion (19) of said mould (13), and said second means for stopping (38) is supported swingably by said housing (41) under such a condition as to be engageable with said received portion (19).

* * * * *